United States Patent
Moriwaki et al.

(10) Patent No.: US 6,788,299 B2
(45) Date of Patent: Sep. 7, 2004

(54) THREE-DIMENSIONAL GRAPHIC PROCESSING DEVICE FOR DRAWING POLYGON HAVING VERTEX DATA DEFINED BY RELATIVE VALUE AND METHOD THEREFOR

(75) Inventors: Shohei Moriwaki, Hyogo (JP); Yoshifumi Azekawa, Hyogo (JP); Osamu Chiba, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 359 days.

(21) Appl. No.: 09/766,840

(22) Filed: Jan. 23, 2001

(65) Prior Publication Data

US 2001/0010522 A1 Aug. 2, 2001

(30) Foreign Application Priority Data

Jan. 27, 2000 (JP) .................................... 2000-018492

(51) Int. Cl.[7] ............................................... G06T 15/00
(52) U.S. Cl. ..................................... 345/419; 345/420
(58) Field of Search .............................. 345/419, 420, 345/421, 422, 423, 424, 426, 427, 428, 473, 611, 586, 619, 631, 643; 382/287, 289, 291, 293

(56) References Cited

U.S. PATENT DOCUMENTS

| | | | | |
|---|---|---|---|---|
| 4,829,446 A | * | 5/1989 | Draney ......................... | 716/11 |
| 4,904,994 A | * | 2/1990 | Sasser et al. ................ | 345/441 |
| 5,519,412 A | * | 5/1996 | Watanabe ................. | 345/472.2 |
| 5,623,584 A | * | 4/1997 | Kurumida .................. | 358/1.11 |
| 5,734,383 A | * | 3/1998 | Akimichi ..................... | 345/420 |
| 5,802,326 A | * | 9/1998 | Becker et al. .............. | 345/854 |
| 5,900,860 A | * | 5/1999 | Ueda ........................... | 345/600 |
| 5,933,132 A | * | 8/1999 | Marshall et al. ............ | 345/158 |
| 6,107,992 A | * | 8/2000 | Ishigaki ....................... | 345/158 |
| 6,307,554 B1 | * | 10/2001 | Arai et al. ................... | 345/423 |
| 6,307,557 B1 | * | 10/2001 | Deering ...................... | 345/428 |
| 6,320,582 B1 | * | 11/2001 | Yamamoto et al. ......... | 345/427 |
| 6,392,644 B1 | * | 5/2002 | Miyata et al. .............. | 345/419 |
| 6,483,939 B2 | * | 11/2002 | Ochi et al. .................. | 382/154 |
| 6,529,643 B1 | * | 3/2003 | Loce et al. ................. | 382/300 |
| 6,603,479 B1 | * | 8/2003 | Mifune et al. .............. | 345/474 |

FOREIGN PATENT DOCUMENTS

| | | |
|---|---|---|
| JP | 7-262387 | 10/1995 |
| JP | 8-101921 | 4/1996 |

* cited by examiner

Primary Examiner—Mark Zimmerman
Assistant Examiner—Enrique L Santiago
(74) Attorney, Agent, or Firm—McDermott Will & Emery LLP

(57) ABSTRACT

A three-dimensional graphic processing device includes an identifying portion for identifying whether the vertex data of a polygon to be drawn is an absolute value or a relative value, an operation unit for operating to obtain the absolute value of vertex data identified as a relative value by the identifying portion and a set up circuit for generating data necessary for drawing based on the absolute value of the vertex data obtained by the operation unit. The operation unit operates to obtain the absolute value of vertex data identified as a relative value by the identifying portion, and therefore the vertex data of a polygon can be expressed by a relative value. As a result, the data amount of polygon data can be reduced, which permits the drawing throughput to be improved.

10 Claims, 18 Drawing Sheets

THREE-DIMENSIONAL GRAPHIC PROCESSING DEVICE FOR DRAWING POLYGON HAVING VERTEX DATA DEFINED BY RELATIVE VALUE AND METHOD THEREFOR

BACKGROUND OF THE INVENTION

1. Field of the Invention

The present invention relates to the technique of displaying three-dimensional images on a screen, and more particularly, to a three-dimensional graphic processing device for displaying an object on a screen with polygons.

2. Description of the Background Art

In recent years, three-dimensional graphic processing devices to process three-dimensional images at a high speed have been actively developed to output lively and dense images in personal computers and home video game machines. In the three-dimensional graphic device, polygons are used as a basic plotting unit to express an object on the screen, and the number of such polygons to be drawn has increased as the graphics has been denser. In order to improve a drop in the drawing throughput by the increase in the number of polygons, the definition of a series of polygons by Strip and Fan or the like have been widely used.

FIGS. 1A to 2B are diagrams for use in illustration of how a series of polygons are drawn in a conventional three-dimensional graphic processing device. FIG. 1A shows the coordinate definition of the basic polygon, which is represented by first point 110, second point 111 and third point 112. FIG. 1B shows the coordinate value data (x coordinate value, y coordinate value) of first point 110, second point 111, and third point 112 of the basic polygon. Note that the coordinate values (x1, y1) of first point 110, the coordinate value (x2, y2) of second point 111 and the coordinate values (x3, y3) of third point 112 are all defined by absolute coordinate values.

FIG. 2A shows the coordinate definition of a series of polygons continuing to the basic polygon shown in FIG. 1A (hereinafter referred to as "second polygons"), which is represented by first point 110, the same point from the basic polygon, third point 112, the same point from the basic polygon, and the newly defined fourth point 116. FIG. 2B shows the coordinate value data of first point 110, fourth point 116 and third point 112 in the second polygon. Note that the coordinate values (x4, y4) of newly defined fourth point 116 are also defined by absolute coordinate values.

In drawing the series of polygons as described above, the coordinates of the vertex added at the time of defining the series of polygons are also defined by absolute coordinate values, and therefore the amount of polygon coordinate data and texture mapping coordinate data necessary for drawing are large. Furthermore, color data associated with each vertex is independently defined, which also increases the amount of data. These disadvantages lower the drawing throughput caused by the restriction in the memory access band, which eventually lowers the performance of the three-dimensional graphic processing device as a whole.

SUMMARY OF THE INVENTION

It is one object of the present invention is to provide a three-dimensional graphic processing device capable of reducing the vertex data of polygons to be drawn and having an improved drawing throughput, and a method therefor.

Another object of the present invention is to provide a three-dimensional graphic processing device capable of preventing the performance of the device as a whole from being lowered by the restriction of the memory access band width and a method therefor.

A three-dimensional graphic processing device according to one aspect of the invention includes an identifying portion for identifying whether the vertex data of a polygon to be drawn is an absolute value or a relative value, an operation portion for operating to obtain the absolute value of vertex data identified as a relative value by the identifying portion and generation portion for generating data necessary for drawing based on the absolute value of the vertex data obtained by the operation portion.

Since the operation portion operates to obtain the absolute value of vertex data identified as a relative value by the identifying portion, the vertex data of polygons can be expressed by a relative value. As a result the amount of polygon data can be reduced, which improves the drawing throughput. The reduction in the data amount permits the number of access to the memory to be reduced, so that degradation in the performance of the device as a whole caused by the restriction of the memory access band width can be prevented.

A three-dimensional graphic processing method according to another aspect of the invention includes the steps of identifying whether the vertex data of a polygon to be drawn is an absolute value or a relative value, operating to obtain the absolute value of vertex data identified as a relative value and generating data necessary for drawing based on the operated absolute value of vertex data.

Since the absolute value of vertex data identified as a relative value is obtained by operation, the vertex data of a polygon can be expressed by a relative value. As a result, the amount of polygon data can be reduced, which improves the drawing throughput. The reduction in the data amount permits the number of access to the memory to be reduced, so that degradation in the performance of the device as a whole caused by the restriction of the memory access band width can be prevented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1A:
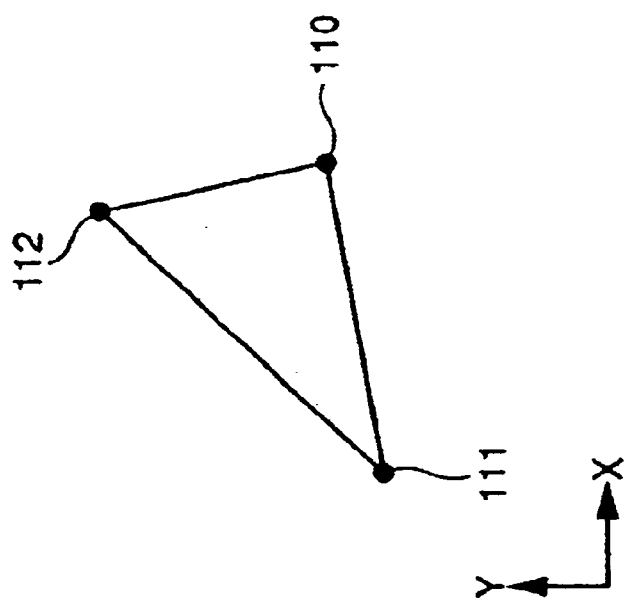
FIGS. 1A and 1B are diagrams for use in illustration of the coordinate definition of a basic polygon to be processed by a conventional three-dimensional graphic processing device.
Figure 1B:
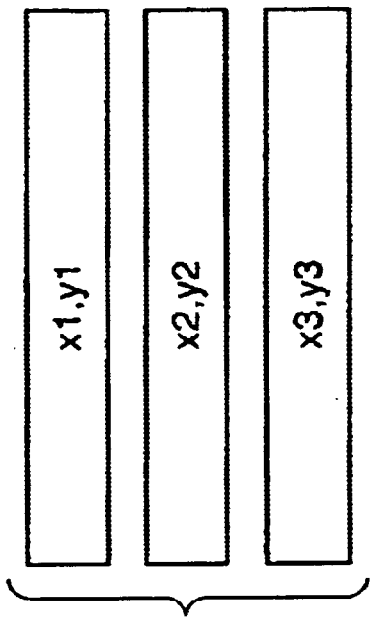
Figure 2B:
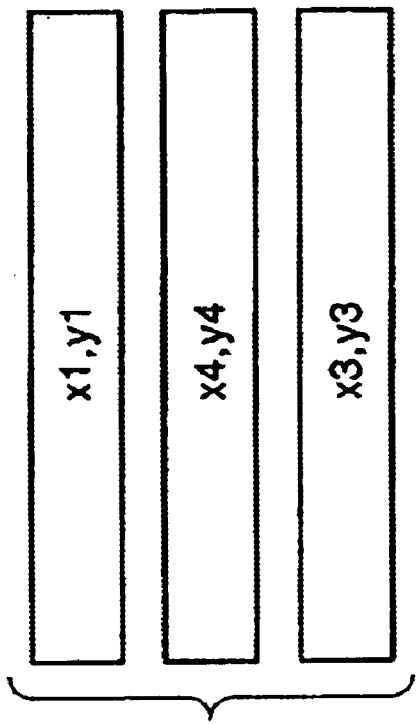
FIGS. 2A and 2B are diagrams for use in illustration of the coordinate definition of a second polygon to be processed by a conventional three-dimensional graphic processing device.
Figure 2A:
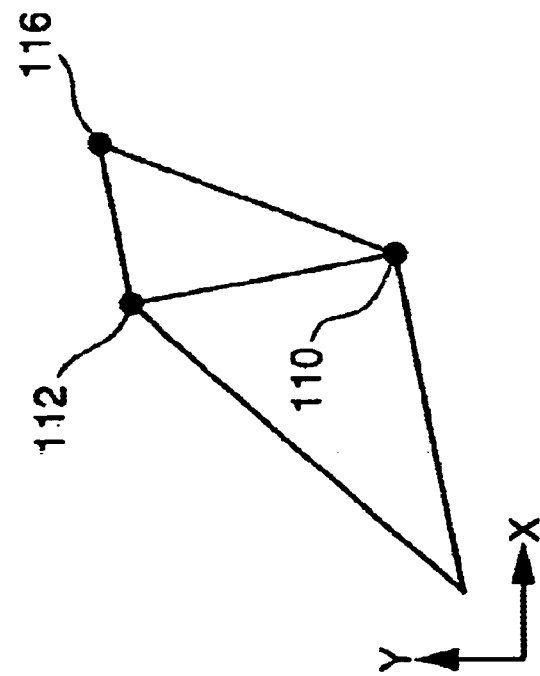
Figure 3:
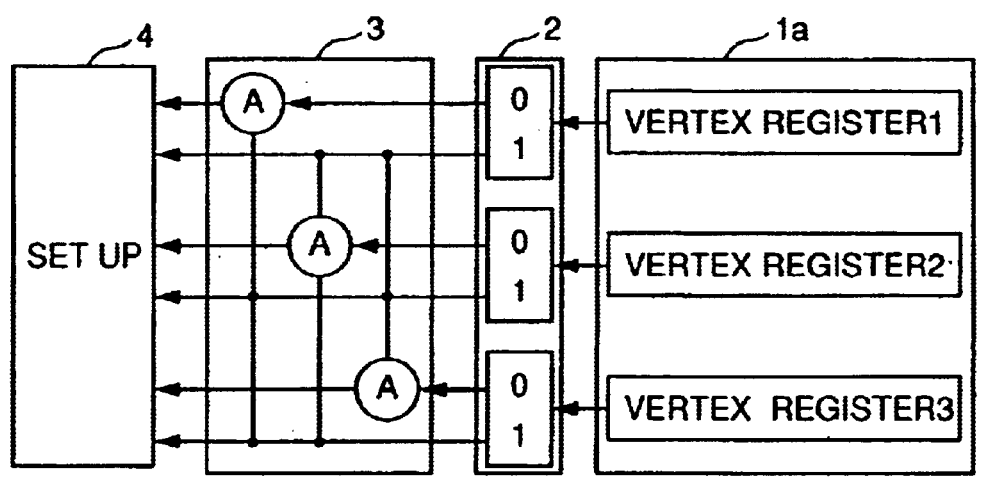
FIG. 3 is a block diagram showing the general configuration of a three-dimensional graphic processing device according to a first embodiment of the present invention.

FIG. 3 is a schematic block diagram of a three-dimensional graphic processing device according to a first embodiment of the present invention. The three-dimensional graphic processing device includes a vertex register $1a$ to store vertex data of polygons (polygon coordinate data, texture mapping coordinate data, color data), an identifying portion 2 to identify whether each piece of vertex data is an absolute value or a relative value, an operation unit 3 to output the absolute value of vertex data identified as an absolute value by identifying portion 2 as it is, and calculate an absolute value for output if the vertex data is identified as a relative value, and a set up circuit 4 to perform a preprocessing for drawing based on the absolute value of the vertex data of the polygon output from operation unit 3.

Set up circuit 4 produces data necessary for drawing a polygon based on the vertex data of the polygon output from operation unit 3. If, for example, texture mapping coordinate data is input, set up circuit 4 cuts a part to be attached to the polygon from pre-stored data such as a photograph, expand/reduces the part to match the size of the polygon, and outputs the produced data. If color data is input, set up circuit 4 calculates the color of each pixel in the polygon based on the color data of each vertex by interpolation, and outputs the produced data.

Note that polygon data is pre-stored in a storage portion such as a RAM (Random Access Memory) which is not shown, and is sequentially set in vertex register $1a$ and identifying portion 2.

Figure 4B:
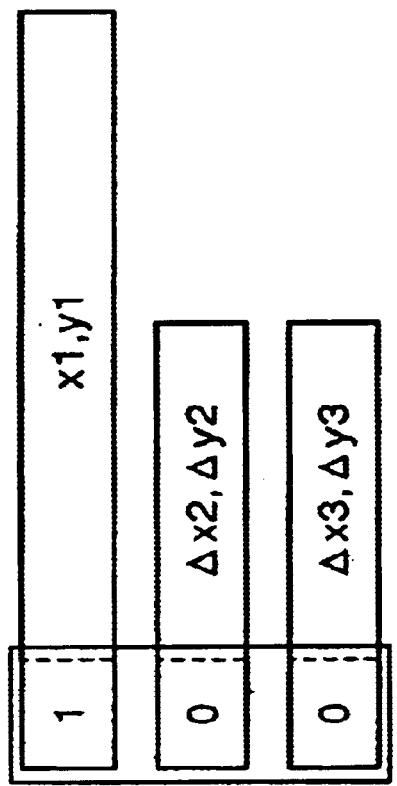
FIGS. 4A and 4B are diagrams for use in illustration of the coordinate definition of a basic polygon to be processed by the three-dimensional graphic processing device according to the first embodiment.
Figure 4A:
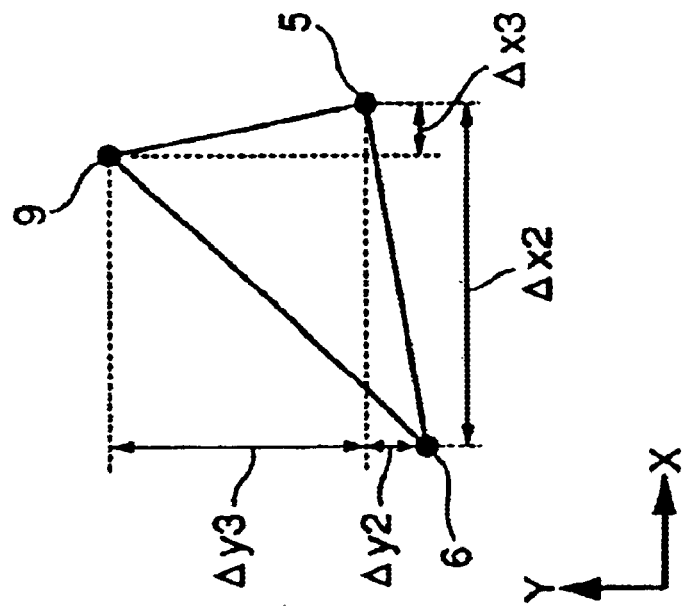

FIGS. 4A to 5B are diagrams for use in illustration of the manner of expressing the vertex coordinates of a series of polygons processed by the three-dimensional graphic processing device according to this embodiment. FIG. 4A shows the coordinate definition of the basic polygon which is expressed by the first point 5, the second point 6 and the third point 9. FIG. 4B shows the identity bit and coordinate value data (x-coordinate value, y-coordinate coordinate value) of the first point 5, the second point 6 and the third point 9 of the basic polygon. The first point 5 of the basic polygon is defined by absolute coordinate values, "1" is for the identity bit, and absolute coordinate values (x1, y1) are set. The second point 6 of the basic polygon is expressed by relative coordinate values, "0" is set for the identity bit, and the difference from the first point 5, relative coordinate values ($\Delta x2$, $\Delta y2$) are set. The third point 9 of the basic polygon is expressed by relative coordinate values, "0" is set for the identity bit, and the difference from the first point 5, relative coordinate values ($\Delta x3$, $\Delta y3$) are set.

The coordinate values and identity bit of each vertex of the basic polygon are set in vertex register 1 and identifying portion 2 shown in FIG. 3. The identity bit of the first point 5 set in identifying portion 2 is "1", and therefore the absolute coordinate values of he first point 5 set in vertex register $1a$ are output to set up circuit 4 as they are. The identity bit of the second point 6 set in identifying portion 2 is "0", and therefore the relative coordinate values of the second point 6 set in vertex register 2 and the absolute coordinate values of the first point 5 set in vertex register 1 are added by operation unit 3 and output to set up circuit 4. The identity bit of the third point 9 set in identifying portion 2 is "0", and the relative coordinate values of the third point 9 and the absolute coordinate values of the first point 5 set in vertex register 1 are added by operation unit 3 and output to set up circuit 4.

Figure 5B:
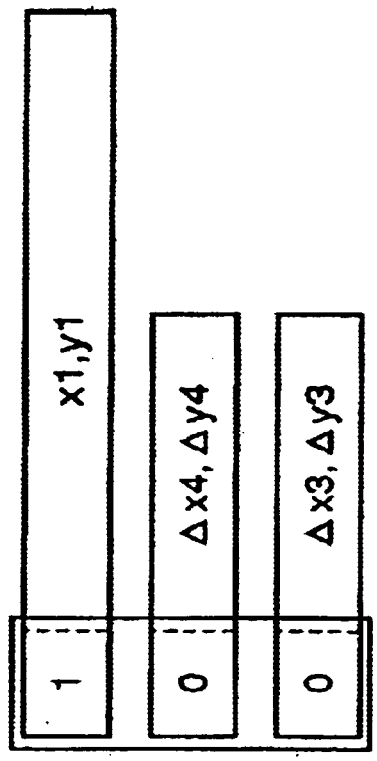
FIGS. 5A and 5B are diagrams for use in illustration of the coordinate definition of a second polygon to be processed by the three-dimensional graphic processing device according to the first embodiment.
Figure 5A:
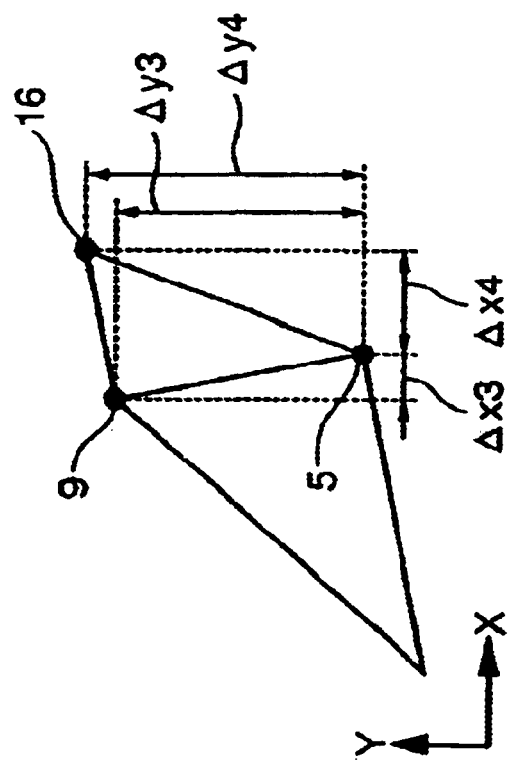

FIG. 5A shows the coordinate definition of the second polygon which is expressed by the first point 5 and the third point 9 continuing from the first polygon, and the fourth, newly defined point 16. FIG. 5B shows the identity bits and coordinate values (x-coordinate value, y-coordinate value) of the first point 5, the fourth point 16 and the third point 9 of the second polygon. The first point 5 of the second polygon is expressed by absolute coordinate values, "1" is set for the identity bit, and absolute coordinate values (x1, y1) are set. The fourth point 16 of the second polygon is expressed by relative coordinate values, "0" is set for the identity bit, and the difference from the first point 5, relative coordinate values ($\Delta x4$, $\Delta y4$) are set. The third point 9 of the second polygon is expressed by relative coordinate values, "0" is set for the identity bit, and the difference from the first point 5, relative coordinate values ($\Delta x3$, $\Delta y3$) are set.

The coordinate values and identity bit of each vertex of the second polygon are set in vertex register $1a$ and identifying portion 2 shown in FIG. 3. Since the identity bit of the first point 5 set in second identifying portion 2 is "1", and therefore the absolute coordinate values of the first point 5 set in vertex register 1 are output to set up circuit 4 as they are. The identity bit of the fourth point 16 set in identifying portion 2 is "0", and therefore the relative coordinate values of the fourth point 16 set in vertex register 2 and the absolute coordinate values of the first point 5 set in vertex register 1 are added by operation unit 3 and output to set up circuit 4. The identity bit of the third point 9 set in identifying portion 2 is "0", and therefore the relative coordinate values of the third point 9 set in vertex register 3 and the absolute coordinate values of the first point 5 set in vertex register 1 are added by operation unit 3 and output to set up circuit 4.

For example, if the x-coordinate value and y-coordinate value in absolute coordinate values are both 32 bits for one picture plane, the x-coordinate value and y-coordinate value in relative coordinate values are both 16 bits corresponding to ¼ a picture plane, and 100 serial polygons are to be defined, (((32+32) bits×3)+((32+32) bits×99))=6528 bits will be necessary as data according to the conventional technique. Meanwhile, according to this embodiment, (((32+32) bits×1)+((16+16) bits×101))=3296 bits will be necessary, and the same 100 polygons can be defined with 3296 bits. As a result, for the same memory access band width, the three-dimensional graphic processing device according to the embodiment can transfer 1.98 times as much polygon data as the conventional three-dimensional graphic processing device.

As described above, in the three-dimensional graphic processing device according to this embodiment, one coordinate value of a polygon is defined using an absolute coordinate value, and the other coordinate value is defined using a relative coordinate value, so that the data amount used for defining the coordinate values of a polygon can be reduced, which improves the drawing throughput. Degradation in the performance of the three-dimensional graphic processing device as a whole caused by the restriction of the memory access band can be prevented.

Second Embodiment

A three-dimensional graphic processing device according to a second embodiment of the present invention has substantially the same configuration as that of the three-dimensional graphic processing device according to the first embodiment shown in FIG. 3. Therefore, the same portions and functions will not be described in detail.

Figure 6B:
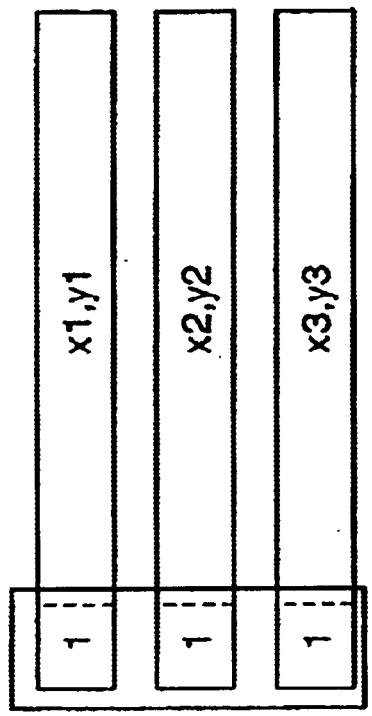
FIGS. 6A and 6B are diagrams for use in illustration of the coordinate definition of a basic polygon to be processed by a three-dimensional graphic processing device according to a second embodiment of the present invention.
Figure 6A:
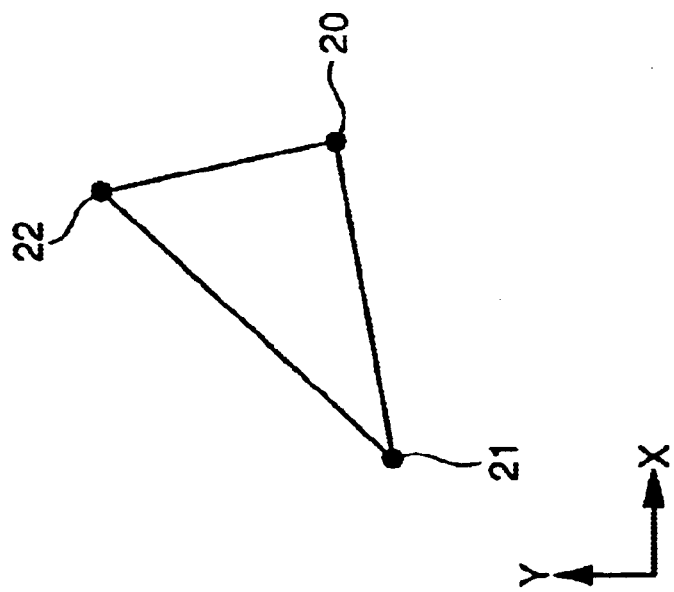

FIGS. 6A to 7B are diagrams for use in illustration of the manner of expressing the vertex coordinates of a series of polygons processed by the three-dimensional graphic processing device according to the embodiment. FIG. 6A shows the coordinate definition of the basic polygon which is expressed by the first point 20, the second point 21 and the third point 22. FIG. 6B shows the identity bits and coordinate values data (x-coordinate value, y-coordinate value) of the first point 20, the second point 21 and the third point 22 of the basic polygon. The first point 20, the second point 21 and the third point 23 of the basic polygon are expressed by absolute coordinate values, "1" is set for the identity bits, and absolute coordinate values (x1, y1), (x2, y2) and (x3, y3) are set, respectively.

The coordinate values and identity bit of each vertex of the basic polygon are set in vertex register 1a and identifying portion 2 shown in FIG. 3. The identity bits of the first point 20, the second point 21 and the third point 22 set in identifying portion 2 are all "1", the absolute coordinate values of the firs point 20, the second point 21 and the third point 22 set in vertex registers 1 to 3 are output to set up circuit 4 as they are.

Figure 7A:
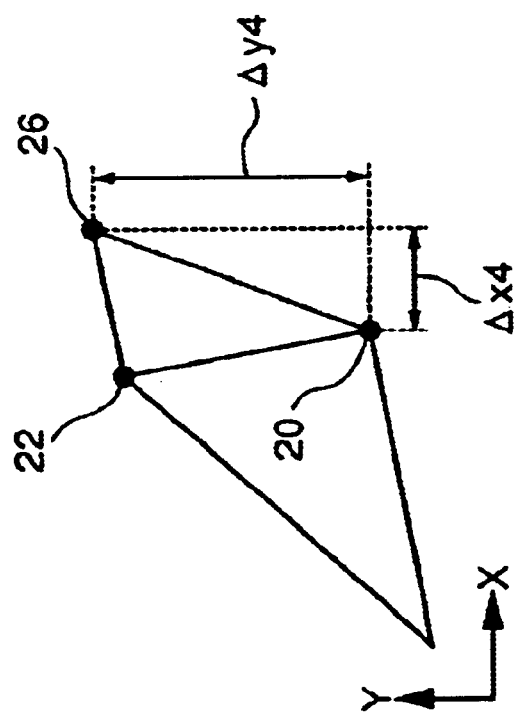
FIGS. 7A and 7B are diagrams for use in illustration of the coordinate definition of a second polygon to be processed by the three-dimensional graphic processing device according to the second embodiment.
Figure 7B:
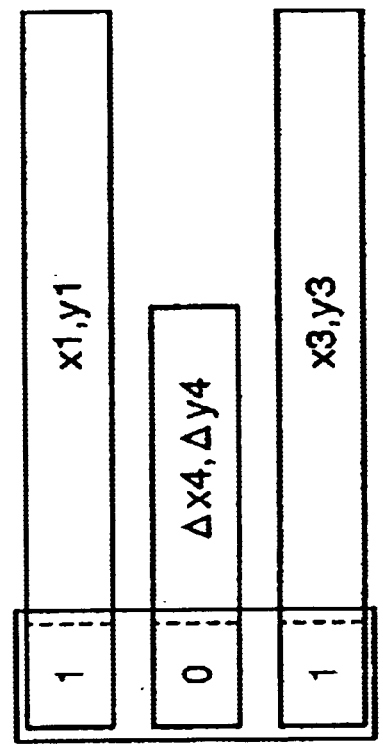

FIG. 7A shows the coordinate definition of the second polygon which is expressed by the first point 20 and the third point 22, the same point from the basic polygon, and the newly defined, fourth point 26. FIG. 7B shows the identity bits and coordinate value data (x-coordinate value, y-coordinate value) of the first point 20, the fourth point 26, and the third point 21 of the second polygon. The first point 20 of the second polygon continues from the basic polygon, therefore the identity bit "1" and absolute coordinate values (x1, y1) are used as they are. The fourth point 26 of the second polygon is expressed by relative coordinate values, "0" is set for the identity bit, and relative coordinate values (Δx4, Δy4) corresponding to the difference from the first point 20 (the vertex already defined in the basic polygon) are set. Since the third point 22 of the second polygon continues from the basic polygon, the identity bit "1" and absolute coordinate values (x3, y3) are used as they are.

The coordinate values and identity bit of each vertex of the second polygon are set in vertex register 1a and identifying portion 2 shown in FIG. 3. The identity bit of the first point 20 set in identifying portion 2 is "1", the absolute coordinate values of the first point 20 set in vertex register 1 are output to set up circuit 4 as they are. Since the identity bit of the fourth point 26 set in identifying portion 2 is "0", the relative coordinate values of the fourth point 26 set in vertex register 2 and the absolute coordinate values of the first point 20 set in vertex register 1 are added by operation unit 3 and output to set up circuit 4. The identity bit of the third point 22 set in identifying portion 2 is "1", and therefore the absolute coordinate values of the third point 22 set in register 3 are output to set up circuit 4 as they are.

As described above, in the third three-dimensional graphic processing device according to the embodiment, the coordinate values of the basic polygon are defined by absolute coordinate values, while other polygons are defined by the differential amount from the vertex coordinates already defined in a preceding polygon, and therefore the amount of data used to define the coordinate values of polygons can be reduced, so that the drawing throughput can be improved. Degradation in the performance of the three-dimensional graphic processing device as a whole caused by the restriction of the memory access band width can be prevented.

Third Embodiment

The three-dimensional graphic processing device according to a third embodiment of the present invention has substantially the same configuration as that of the first embodiment shown in FIG. 3. Therefore, the same portions and functions will not be described in detail.

Figure 8B:
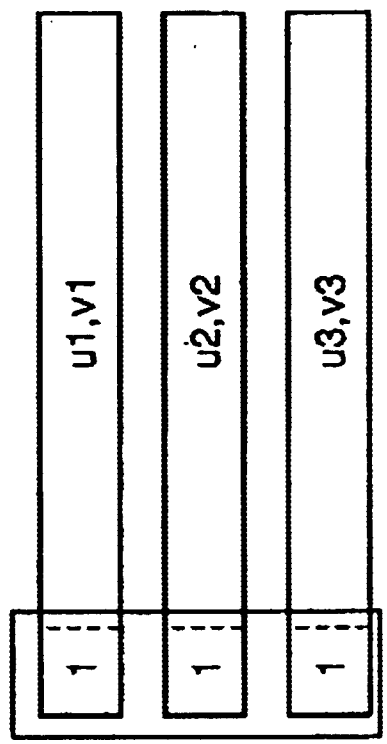
FIGS. 8A and 8B are diagrams for use in illustration of the texture coordinate definition of a basic polygon to be processed by a three-dimensional graphic processing device according to a third embodiment of the present invention.
Figure 8A:
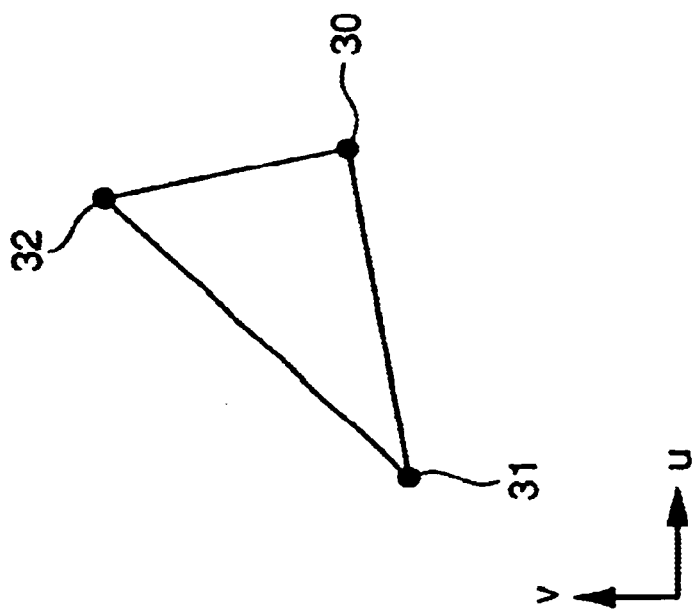

FIGS. 8A to 9B are diagrams for use in illustration of the manner of expressing texture coordinates of a series of polygons with texture mapping to be processed by the three-dimensional graphic processing device according to this embodiment. FIG. 8A shows the texture coordinate definition of the basic polygon on texture mapping data, and the basic polygon on the texture mapping data is expressed by the first point 30, the second point 31 and the third point 32. FIG. 8B shows the identity bits and coordinate value data (u-coordinate value, v-coordinate value) of the first point 30, the second point 31 and the third point 32 of the basic polygon on the texture mapping data. The first point 30, the second point 31 and the third point 32 of the basic polygon on the texture mapping data are all expressed by absolute coordinate values, "1" is set for the identity bits, and absolute coordinate values (u1, v1), (u2, v2) and (u3, v3) are set, respectively.

The coordinate values and identity bit of each vertex of the basic polygon on the texture mapping data are set in vertex register 1a and identifying portion 2 shown in FIG. 3. The identity bits of the first point 30, the second point 31 and the third point 32 set in identifying portion 2 are all "1", and therefore the absolute coordinate values of the first point 30, the second point 31 and the third point 32 set in vertex registers 1 to 3 are output to set up circuit 4 as they are.

Figure 9B:
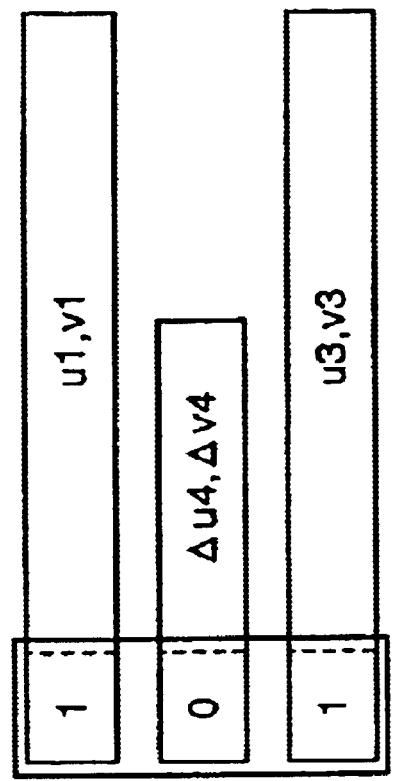
FIGS. 9A and 9B are diagrams for use in illustration of the texture coordinate definition of a second polygon to be processed by the three-dimensional graphic processing device according to the third embodiment.
Figure 9A:
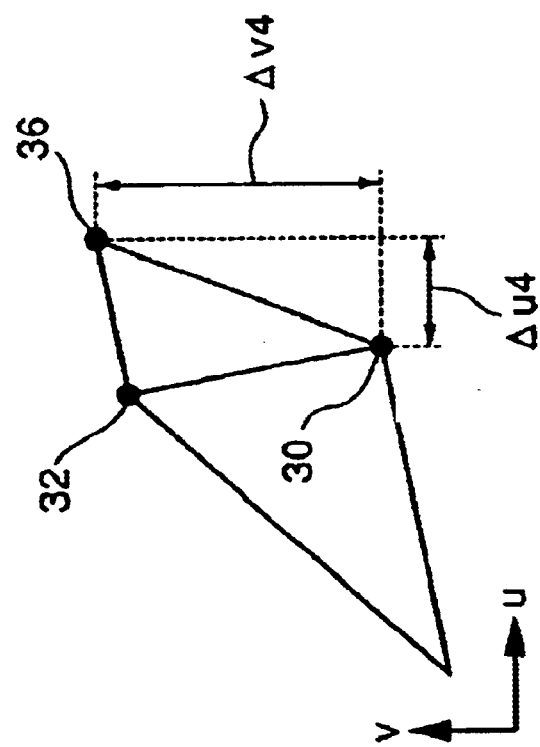

FIG. 9A shows the texture coordinate definition of the second polygon on texture mapping data, and the second polygon is expressed by the first point 30 and the third point 32, the same points from the basic polygon, and the newly defined, fourth point 36. FIG. 9B shows the identity bits and coordinate value data (u-coordinate value, v-coordinate value) of the first point 30, the fourth point 36 and the third point 32 of the second polygon. The first point 30 of the second polygon is the same point from the basic polygon, and therefore the identity bit "1" and absolute coordinate values (u1, v1) are used as they are. The fourth point 36 of the second polygon is expressed by relative coordinate values, "0" is set for the identity bit, and the difference from the first point 30 (the vertex already defined in the basic polygon), relative coordinate values ($\Delta u4$, $\Delta v4$) are set. The third point 32 of the second polygon is the same point from the basic polygon, and therefore the identity bit "1" and absolute coordinate values (u3, v3) are used as they are.

The coordinate values and identity bit of each vertex of the second polygon on texture mapping data are set in vertex register 1a and identifying portion 2 shown in FIG. 3. The identity bit of the first point 30 set in the identifying portion 2 is "1", and therefore the absolute coordinate values of the first point 30 set in vertex register 1 are output to set up circuit 4 as they are. The identity bit of the fourth point 36 set in identifying portion 2 is "0", and therefore the relative coordinate values of the fourth point 36 set in vertex register 2 and the absolute coordinate values of the first point 30 set in vertex register 1 are added by operation unit 3 and output to set up circuit 4. Since the identity bit of the third point 32 set in identifying portion 2 is "1", and therefore the absolute coordinate values of the third point set in vertex register 3 are output to set up circuit 4 as they are.

If, for example, the u-coordinate and v-coordinate of the absolute coordinate values are both 32 bits, the u-coordinate and v-coordinate of the relative coordinate values are both 16 bits, and 100 serial polygons are defined, (((32+32) bits×3)+((32+32) bits×99))=6528 bits will be necessary as data according to the conventional technique. Meanwhile, according to this embodiment, (((32+32) bits×1)+((16+16) bits×101))=3296 bits will be necessary, and the same 100 polygons can be defined with 3296 bits. As a result, for the same memory access band width, the three-dimensional graphic processing device according to the embodiment can transfer 1.98 times as much polygon data as the conventional three-dimensional graphic processing device.

As described above, the three-dimensional graphic processing device according to the embodiment defines the coordinate values of the basic polygon on the texture mapping data by absolute coordinate values, while other polygons are defined by the difference from the vertex coordinate already defined in the preceding polygon, so that the amount of data used to define coordinate values on texture mapping data in data to be overlapped to serial polygons can be reduced, which improves the drawing throughput. Furthermore, degradation in the performance of the three-dimensional graphic processing device as a whole caused by the restriction of the memory access band width can be prevented.

Fourth Embodiment

A three-dimensional graphic processing device according to a fourth embodiment of the present invention has substantially the same configuration as that of the three-dimensional graphic processing device according to the first embodiment shown in FIG. 3. Therefore, the same portions and functions will not be described in detail.

Figure 10B:
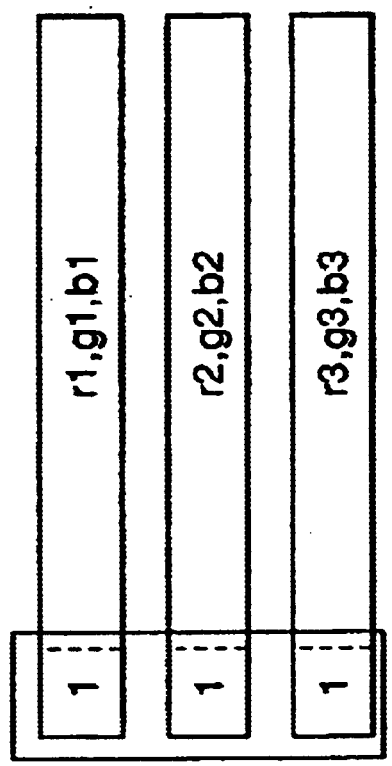
FIGS. 10A and 10B are diagrams for use in illustration of the color data definition of a basic polygon to be processed by a three-dimensional graphic processing device according to a fourth embodiment of the present invention.
Figure 10A:
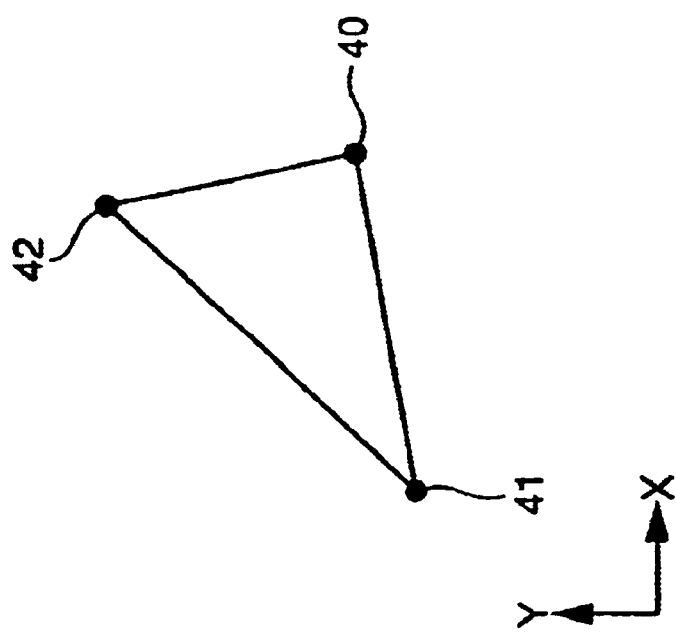

FIGS. 10A to 11B are diagrams for use in illustration of the manner of expressing color data of a series of polygons processed by the three-dimensional graphic processing device according to this embodiment. FIG. 10A shows the color data definition of the basic polygon which is expressed by color data 40 at the first point, color data 41 at the second point and color data 42 at the third point. FIG. 10B shows the identity bits and color data (r value, g value, b value) at the first to third points of the basic polygon. The color data at the first to third points is each expressed by an absolute value, "1" is set for the identity bits, and absolute values (r1, g1, b1), (r2, g2, b2) and (r3, g3, b3) are set.

The color data and identity bit of each vertex of the basic polygon are set in vertex register 1 and identifying portion 2. The identity bits of color data 40 at the first point, color data 41 at the second point, and color data 42 at the third point are all "1", and therefore the color data at the first to third points set in vertex registers 1 to 3 are output to set up circuit 4 as they are.

Figure 11B:
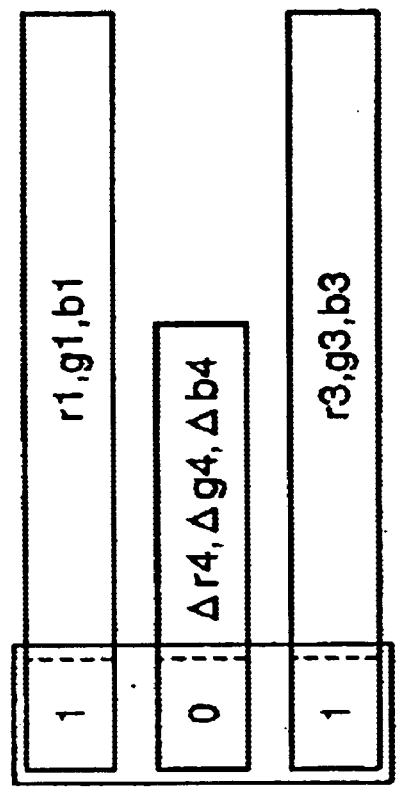
FIGS. 11A and 11B are diagrams for use in illustration of the color data definition of a second polygon to be processed by the three-dimensional graphic processing device according to the fourth embodiment.
Figure 11A:
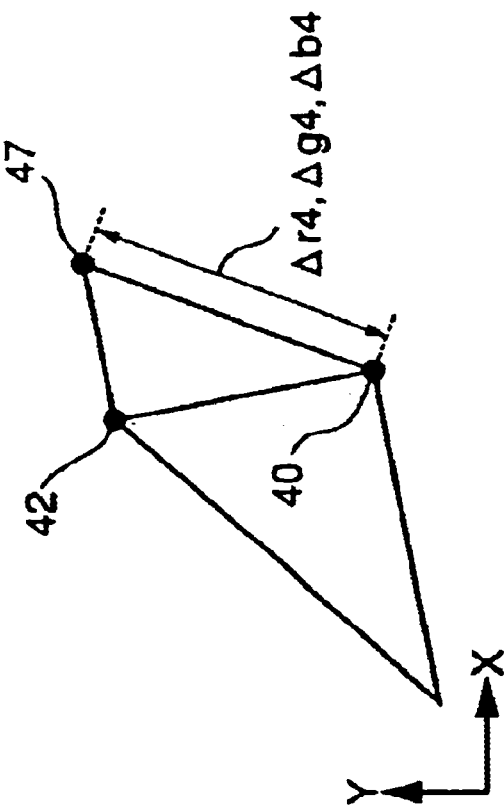

FIG. 11A shows the color data definition of the second polygon which is expressed by color data 40 at the first point and color data 42 at the third point, the same data from the basic polygon and newly defined color data 47 at the fourth point. FIG. 11B shows the identity bits and color data (r value, g value, b value) at the first, fourth and third points of the second polygon. Color data 40 at the first point of the second polygon is the same data from the basic polygon, and therefore the identity bit "1" and absolute values (r1, g1, b1) are used as they are. Color data 47 at the fourth point of the second polygon is expressed by relative values, "0" is set for the identity bit, and the difference from color data 40 at the first point (the vertex already defined in the basic polygon), relative values ($\Delta r4$, $\Delta g4$, $\Delta b4$) are set. Color data 42 at the third point of the second polygon is the same data from the basic polygon, and therefore the identity bit "1" and absolute values (r3, g3, b3) are used as they are.

The color data and identity bit of each vertex of the second polygon are set in vertex register 1a and identifying portion 2 shown in FIG. 3. The identity bit of color data at the first point set in identifying portion 2 is "1", and therefore color data 40 (absolute values) at the first point set in vertex register 1 is output to set up circuit 4 as it is. The identity bit of color data at the fourth point set in identifying portion 2 is "0", and therefore color data 47 (relative values) at the fourth point set in vertex register 2 and color data 40 (absolute values) at the first point set in vertex register 1 are added by operation unit 3 and output to set up circuit 4. The identity bit of the color data at the third point set in identifying portion 2 is "1", and therefore color data 42 (absolute values) at the third point set in vertex register 3 is output to set up circuit 4 as it is.

If, for example, the absolute value of color data at a vertex is 32 bits, the relative value of color data at a vertex is 16 bits, and 100 serial polygons are defined, ((32 bits×3)+(32 bits×99))=3264 bits will be necessary as data according to the conventional technique. Meanwhile, according to this embodiment, ((32 bits×1)+(16 bits×101))=1648 bits will be necessary, and the same 100 polygons can be defined with 1648 bits. As a result, for the same memory access band width, the three-dimensional graphic processing device according to the embodiment can transfer 1.98 times as much polygon data as the conventional three-dimensional graphic processing device.

As described above, the three-dimensional graphic processing device according to the embodiment defines the color data of the basic polygon by an absolute value, while other polygons are defined by the difference from the color data already defined in the preceding polygon, so that the amount of data for color data of a polygon can be reduced, which improves the drawing throughput. Furthermore, degradation in the performance of the three-dimensional graphic processing device as a whole caused by the restriction of the memory access band width can be prevented.

Fifth Embodiment

Figure 12:
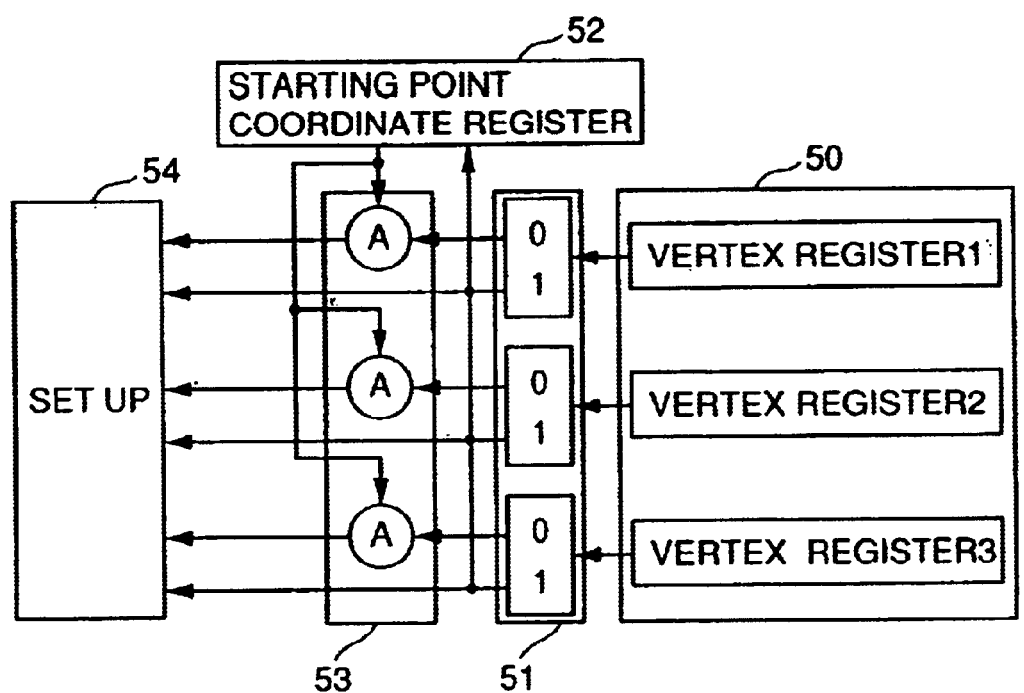
FIG. 12 is a block diagram of the general configuration of a three-dimensional graphic processing device according to a fifth embodiment of the present invention.

FIG. 12 is a block diagram showing the general configuration of a three-dimensional graphic processing device according to a fifth embodiment of the present invention. The three-dimensional graphic processing device includes a vertex register 50 to store the vertex data of each polygon, an identifying portion 51 to identify whether each vertex data is an absolute value or a relative value, a starting point coordinate register 52 to store an absolute value output from identifying portion 51 as a starting point coordinate value, an operation unit 53 to output the absolute value of vertex data identified as an absolute value by identifying portion 51 as it is, and calculate an absolute value by adding a relative value to the starting point coordinate value stored in starting point coordinate register 52 for output if the vertex data is identified as a relative value, and a set up circuit 54 to perform preprocessing for drawing based on the absolute value of each polygon output from operation unit 53.

Note that polygon data is pre-stored in a storage portion such as RAM which is not shown, and sequentially set in vertex register 50 and identifying portion 51. Set up circuit 54 has the same function as that of set up circuit 4 shown in FIG. 3.

Figure 13B:
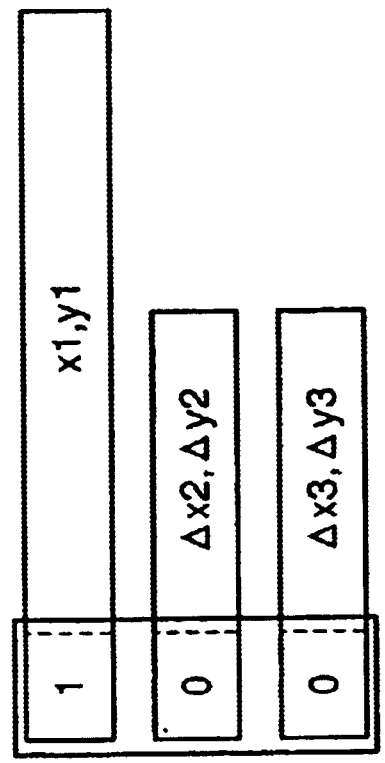
FIGS. 13A and 13B are diagrams for use in illustration of the coordinate definition of a basic polygon to be processed by the three-dimensional graphic processing device according to the fifth embodiment.
Figure 13A:
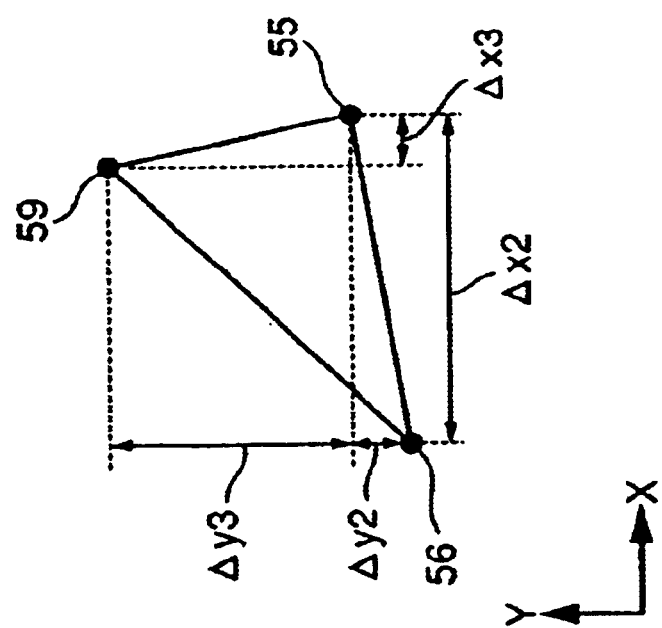

FIGS. 13A to 14B are diagrams for use in illustration of the manner of expressing the vertex coordinates of a series of polygons processed by the three-dimensional graphic processing device according to the embodiment. FIG. 13A shows the coordinate definition of the basic polygon which is expressed by the first point 55, the second point 56 and the third point 59. FIG. 13B shows the identity bits and coordinate value data (x-coordinate value, y-coordinate value) of the first point 55, the second point 56 and the third point 59 of the basic polygon. The first point 55 of the basic polygon is expressed by absolute coordinate values, "1" is set for the identity bit, and absolute coordinate values (x1, y1) are set. The second point 56 of the basic polygon is expressed by relative coordinate values, "0" is set for the identity bit, and the difference from the first point 55, relative coordinate values ($\Delta$x2, $\Delta$y2) are set. The third point 59 of the basic polygon is expressed by relative coordinate values, "0" is set for the identity bit, and the difference from the first point 55, relative coordinate values ($\Delta$x3, $\Delta$y3) are set.

The coordinate values and identity bit of each vertex of the basic polygon are set in vertex register 50 and identifying portion 51 shown in FIG. 12. The identity bit of the first point 55 set in identifying portion 51 is "1", and therefore the absolute coordinate values of the first point 55 set in vertex register 1 are output to set up circuit 54 as they are, and its absolute coordinate values are stored in starting point coordinate register 52. The identity bit of the second point 56 set in identifying portion 51 is "0", and therefore the relative coordinate values of the second point set in vertex register 2 and the absolute coordinate values of the first point 55 stored in starting point coordinate register 52 are added by operation unit 53 and output to set up circuit 54.

Figure 14B:
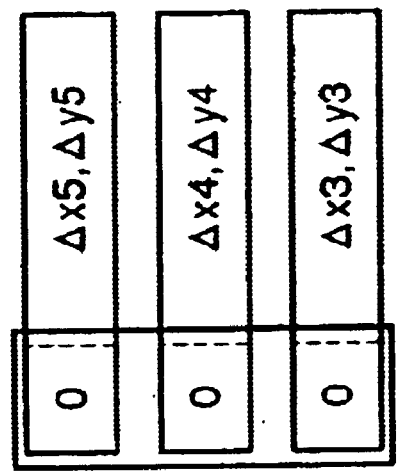
FIGS. 14A and 14B are diagrams for use in illustration of the coordinate definition of a third polygon to be processed by the three-dimensional graphic processing device according to the fifth embodiment.
Figure 14A:
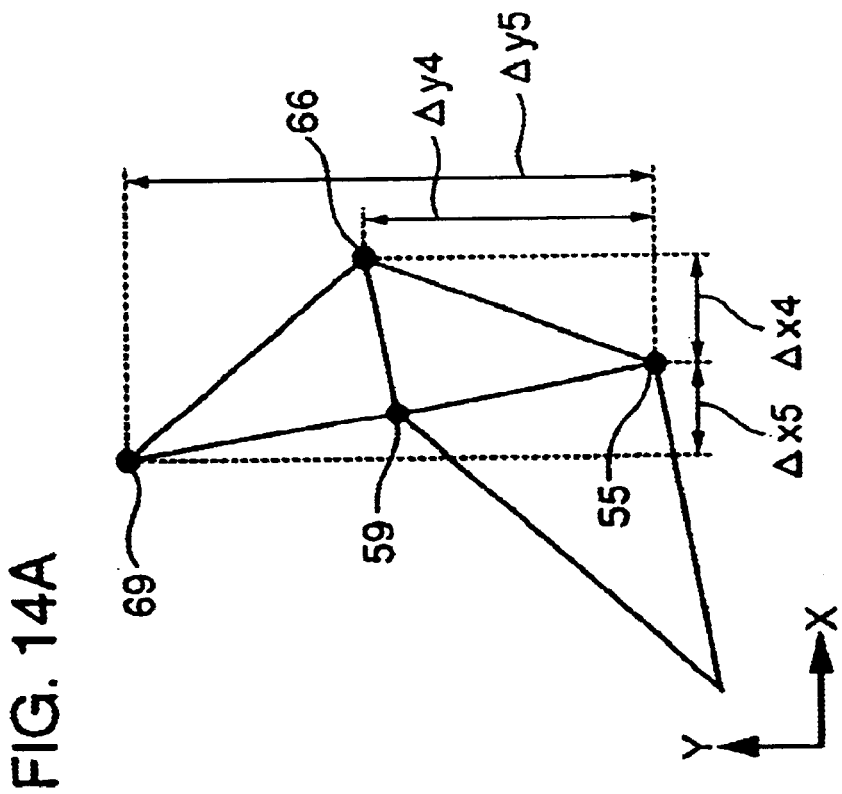

FIG. 14A shows the coordinate definition of the third polygon (a polygon to be drawn after the second polygon is drawn), and the third polygon is expressed by the third point 59, the same point from the basic polygon and newly defined fourth point 66 and fifth point 69. FIG. 14B shows the identity bits and coordinate values data (x-coordinate value, y-coordinate coordinate value) of the fifth point 69, fourth point 66 and third point 59 of the third polygon. The fifth point 69 of the third polygon is expressed by relative coordinate values from the first point 55 of the basic polygon stored in starting point coordinate register 52, "0" is set for the identity bit, and the difference from the first point 55 of the basic polygon, relative coordinate values ($\Delta$x5, $\Delta$y5) are set. The fourth point 66 of the third polygon is expressed by relative coordinate values from the first point 55 of the basic polygon stored in the starting point coordinate register 52, "0" is set for the identity bit, and the difference from the first point 55 of the basic polygon, relative coordinate values ($\Delta$x4, $\Delta$y4) are set. The third point 59 of the third polygon is expressed by relative coordinate values from the first point 55 of the basic polygon stored in starting point coordinate register 52, "0" is set for the identity bit, and the difference from the first point 55 of the basic polygon, relative coordinate values ($\Delta$x3, $\Delta$y3) are set.

The coordinate values and identity bit of each vertex of the third polygon are set in vertex register 50 and identifying portion 51 shown in FIG. 12. The identity bit of the fifth point 69 set in identifying portion 51 is "0", and therefore the relative coordinate values of the fifth point 69 set in vertex register 1 and the absolute coordinate values of the first point 55 of the basic polygon stored in starting coordinate register 52 are added by operation unit 53 and output to set up circuit 54. The identity bit of the fourth point 66 set in vertex register 2 is "0", and therefore the relative coordinate values of the fourth point 66 set in vertex register 2 and the absolute coordinate values of the first point 55 of the basic polygon stored in starting point coordinate register 52 are added by operation unit 53 and output to set up circuit 54. The identity bit of the third point 59 set in identifying portion 51 is "0" and therefore the relative coordinate values of the third point 59 set in vertex register 3 and the absolute coordinate values of the first point 55 of the basic polygon stored in starting point coordinate register 52 are added by operation unit 53 and output to set up circuit 54.

If, for example, the x-coordinate and y-coordinate of the absolute coordinate values are both 32 bits for one picture plane, the x-coordinate and y-coordinate of the relative coordinate values are both 16 bits for ¼ a picture plane, and 100 serial polygons are defined, (((32+32) bits×3)+((32+32) bits×99))=6528 bits will be necessary as data according to the conventional technique. Meanwhile, according to this embodiment, (((32+32) bits×1)+((16+16) bits×101))=3296 bits will be necessary, and the same 100 polygons can be defined with 3296 bits. As a result, for the same memory access band width, the three-dimensional graphic processing device according to the embodiment can transfer 1.98 times as much polygon data as the conventional three-dimensional graphic processing device.

As in the foregoing, in the three-dimensional graphic processing device according to the embodiment, absolute coordinate values are stored in starting point coordinate register 52, and the coordinates of each vertex are defined by the difference from the starting point coordinates, so that the amount of data used to define the coordinate values of a polygon can be reduced, which improves the drawing throughput. Furthermore, degradation in the performance of the three-dimensional graphic processing device as a whole caused by the restriction of the memory access band width can be prevented.

Sixth Embodiment

A three-dimensional graphic processing device according to a sixth embodiment of the present invention has substantially the same configuration as that of the fifth embodiment shown in FIG. 12. Therefore, the same portions and functions will not be described in detail.

Figure 15B:
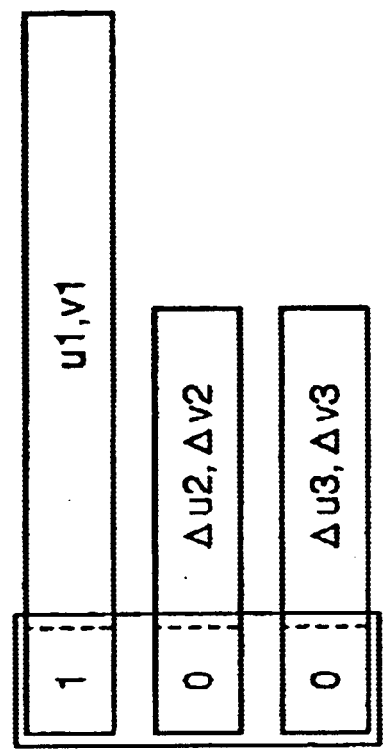
FIGS. 15A and 15B are diagrams for use in illustration of the texture coordinate definition of a basic polygon to be processed by a three-dimensional graphic processing device according to a sixth embodiment of the present invention.
Figure 15A:
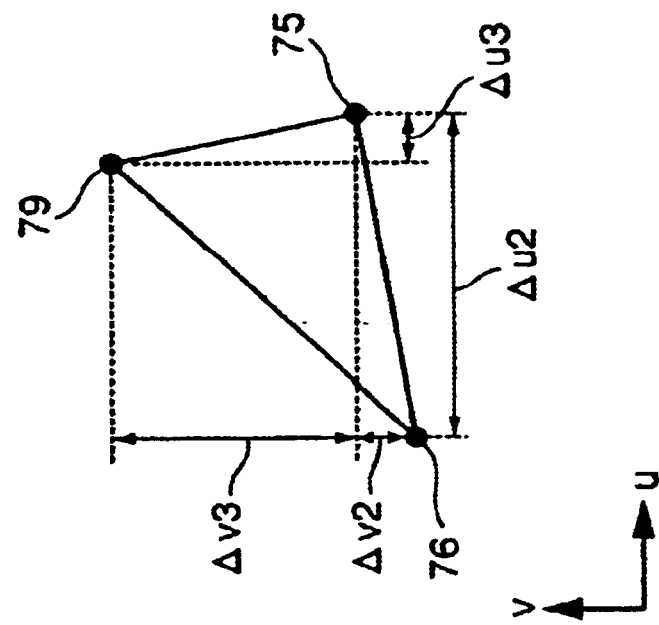

FIGS. 15A to 16B are diagrams for use in illustration of the manner of expressing the texture coordinates of a series of polygons with texture mapping to be processed by the three-dimensional graphic processing device according to the embodiment. FIG. 15A shows the texture coordinate definition of the basic polygon on texture mapping data, and the basic polygon on the texture mapping data is expressed by the first point 75, the second point 76 and the third point 79. FIG. 15B shows the identity bits and coordinate value data (u-coordinate value, v-coordinate value) of the first point 75, the second point 76 and the third point 79 of the basic polygon on the texture mapping data. The first point 75 of the basic polygon on the texture mapping data is expressed by absolute coordinate values, "1" is set for the identity bit, and absolute coordinate values (u1, v1) are set. The second point 76 of the basic polygon is expressed by relative coordinate values, and "0" is set for the identity bit, the difference from the first point 75, relative coordinate values ($\Delta$u2, $\Delta$v2) are set. The third point 79 of the basic polygon is expressed by relative coordinate values, and "0" is set for the identity bit, and the difference from the first point 75, relative coordinate values ($\Delta$u3, $\Delta$v3) are set.

The coordinate values and identity bit of each vertex of the basic polygon on texture mapping data are set in vertex register 50 and identifying portion 51 shown in FIG. 12. The identity bit of the first point 75 set in identifying portion 51 is "1" and therefore the absolute coordinate values of the first point 75 set in vertex register 1 register 111 are output to set up circuit 54 as they are, and its absolute coordinate values are stored in starting point coordinate register 52. The identity bit of the second point 76 set in identifying portion 51 is "0", and therefore the relative coordinate values of the second point 76 set in vertex register 2 and the absolute coordinate values of the first pint 75 stored in starting point coordinate register 52 are added by operation unit 53 and output to set up circuit 54. The identity bit of the third point 79 set in identifying portion 51 is "0", and therefore the relative value of the third point 79 set in vertex register 3 and the absolute coordinate values of the first point 75 stored in starting point register 52 are added and output to set up circuit 54.

Figure 16B:
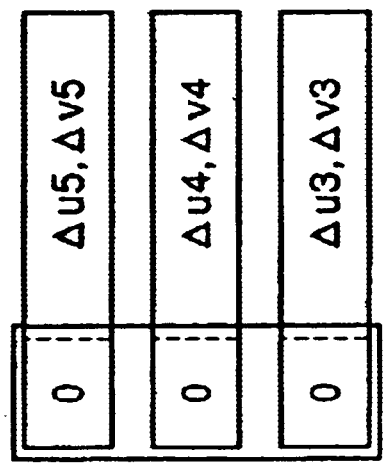
FIGS. 16A and 16B are diagrams for use in illustration of the texture coordinate definition of a third polygon to be processed by the three-dimensional graphic processing device according to the sixth embodiment.
Figure 16A:
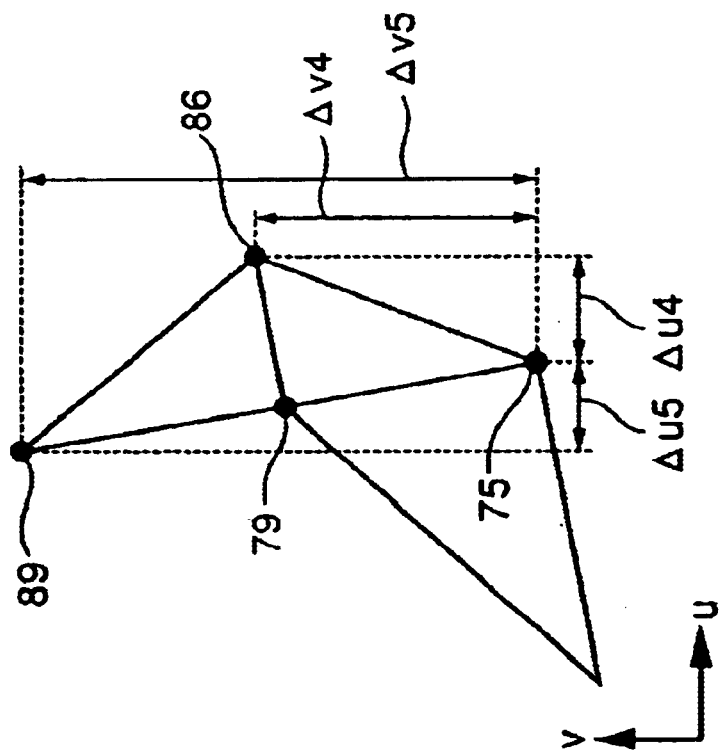

FIG. 16A shows the texture coordinate definition of the third polygon on texture mapping data, and the third polygon is expressed by the third point 79, the same point from the basic polygon, and newly defined fourth point 86 and fifth point 89. FIG. 16B shows the identity bit and coordinate values data (u-coordinate value, v-coordinate value) of the fifth point 89, the fourth point 86 and the third point 79 of the third polygon. The fifth point 89 of the third polygon is expressed by relative coordinate values from the first point 75 of the basic polygon stored in starting point coordinate register 52, "0" is set for the identity bit, and the difference from the first point 75 of the basic polygon stored in starting point coordinate register 52, relative coordinate values ($\Delta$u5, $\Delta$v5) are set. The fourth point 76 of the third polygon is expressed by relative values from the first point 75 of the basic polygon stored in starting point coordinate register 52, therefore "0" is set for the identity bit, and the difference from the first point 75 of the basic polygon, relative coordinate values ($\Delta$u4, $\Delta$v4) are set. The third point 79 of the third polygon is expressed by relative coordinate values from the first point 75 of the basic polygon stored in starting point coordinate register 52, "0" is set for the identity bit, and the difference from the first point 75 of the basic polygon, relative coordinate values ($\Delta$u3, $\Delta$v3) are set.

The coordinate values and identity bit of each vertex of the third polygon on texture mapping data are set in vertex register 50 and identifying portion 51 shown in FIG. 12. The identity bit of the fifth point 89 set in identifying portion 51 is "0", and therefore the relative coordinate values of the fifth point 89 set in vertex register 1 and the absolute coordinate values of the first point 75 stored in starting point coordinate register 52 are added by operation unit 53 and output to set up circuit 54. The identity bit of the fourth point 86 set in identifying portion 51 is "0", and therefore the relative coordinate values of the fourth point 86 set in vertex register 2 and the absolute values of the first point 75 of the basic polygon stored in starting coordinate register 52 are added by operation unit 53 and output to set up circuit 54. The identity bit of the third point 79 set in identifying portion 51 is "0", and therefore the relative coordinate values of the third point 79 set in vertex register 3 and the absolute values of the first point 75 of the basic polygon stored in starting point coordinate register 52 are added by operation unit 53 and output to set up circuit 54.

If, for example, the u-coordinate and v-coordinate of the absolute coordinate values are both 32 bits for one picture plane, the u-coordinate and v-coordinate of the relative coordinate values are both 16 bits for ¼ a picture plane, and 100 serial polygons are defined, (((32+32) bits×3)+((32+32) bits×99))=6528 bits will be necessary as data according to the conventional technique. Meanwhile, according to this embodiment, (((32+32) bits×1)+((16+16) bits×101))=3296 bits will be necessary, and the same 100 polygons on the texture mapping data can be defined with 3296 bits. As a result, for the same memory access band width, the three-dimensional graphic processing device according to the embodiment can transfer 1.98 times as much polygon data as the conventional three-dimensional graphic processing device.

As in the foregoing, the three-dimensional graphic processing device according to the embodiment defines the coordinates of a polygon as the staring point on texture mapping data by absolute coordinate values, while the coordinates of a series of other polygons are defined by relative coordinate values, so that the amount of data used to define coordinate values on texture mapping data in data to be overlapped to the series of polygon data can be reduced, which improves the drawing throughput. Furthermore, degradation in the performance of the three-dimensional graphic processing device as a whole caused by the restriction of the memory access band width can be prevented.

Seventh Embodiment

The three-dimensional graphic processing device according to a seventh embodiment of the present invention has substantially the same configuration as that of the three-dimensional graphic processing device according to the fifth embodiment shown in FIG. 12. Therefore, the same portions and function will not be described in detail.

Figure 17B:
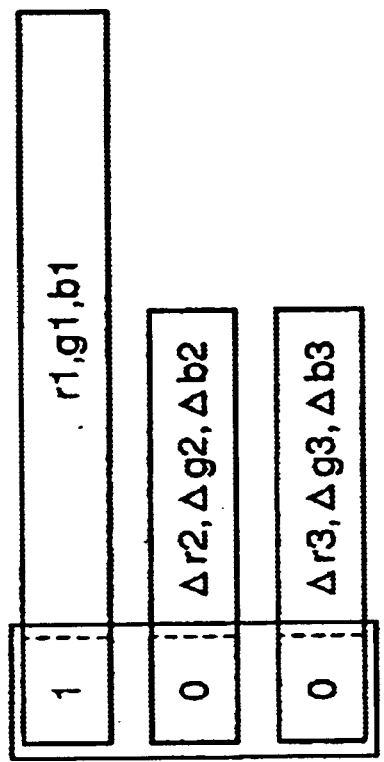
FIGS. 17A and 17B are diagrams for use in illustration of the color data definition of a basic polygon to be processed by a three-dimensional graphic processing device according to a seventh embodiment of the present invention.
Figure 17A:
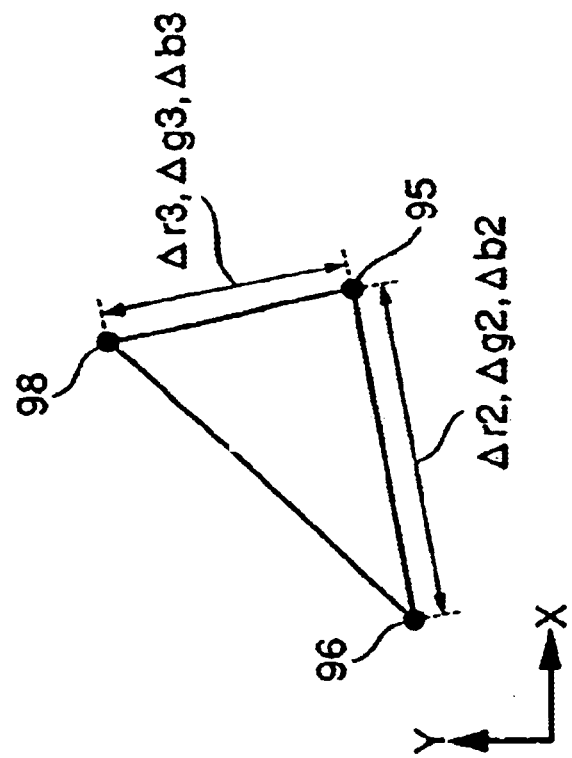

FIGS. 17A to 18B are diagrams for use in illustration of the manner of expressing the color data of a series of polygons to be processed by three-dimensional graphic processing device according to the embodiment. FIG. 17A shows the color data definition of the basic polygon which is expressed by color data 95 at the first point, color data 96 at the second point and color data 98 at the third point. FIG. 17B shows the identity bits and color data (r value, g value, b value) of the first point, second point and third point of the basic polygon. Color data 95 at the first point of the basic polygon is expressed by absolute values, "1" is set for the identity bit, and absolute values (r1, g1, b1) are set. Color data 96 at the second point of the basic polygon is expressed by absolute values, "0" is set for the identity bit, and the difference from color data 95 at the second point of the basic polygon, relative values ($\Delta r2$, $\Delta g2$, $\Delta b2$) are set. Color data 98 at the third point of the basic polygon is expressed by absolute values, "0" is set for the identity bit, and the difference from color data 95 at the first point, relative values ($\Delta r3$, $\Delta g3$, $\Delta b3$) are set.

The color data and identity bit of each vertex of the basic polygon are set in vertex register 50 and identifying portion 51 shown in FIG. 12. The identity bit of color data 95 at the first point set in identifying portion 51 is "1", therefore the absolute values of color data 95 at the first point set in vertex register 1 are output to set put circuit 54 as they are, and the absolute values are stored in starting point coordinate register 52. The identity bit of color data 96 at the second point set in identifying portion 51 is "0", and the absolute values of color data 96 at the second point set in vertex register 2 and the absolute values of color data 95 at the first point stored in starting point coordinate register 52 are added by operation unit 53 and output to set up circuit 54. The identity bit of color data 98 at the third point set in identifying portion 51 is "0", therefore the absolute values of color data 98 at the third point set in vertex register 3 and the absolute values of color data 95 at first point stored in starting point coordinate register 52 are added by operation unit 53 and output to set up circuit 54.

Figure 18B:
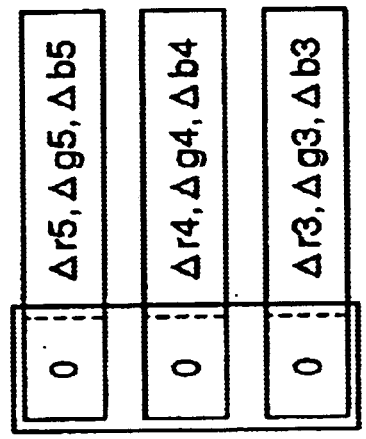
FIGS. 18A and 18B are diagrams for use in illustration of the color data definition of a third polygon to be processed by the three-dimensional graphic processing device according to the seventh embodiment.
Figure 18A:
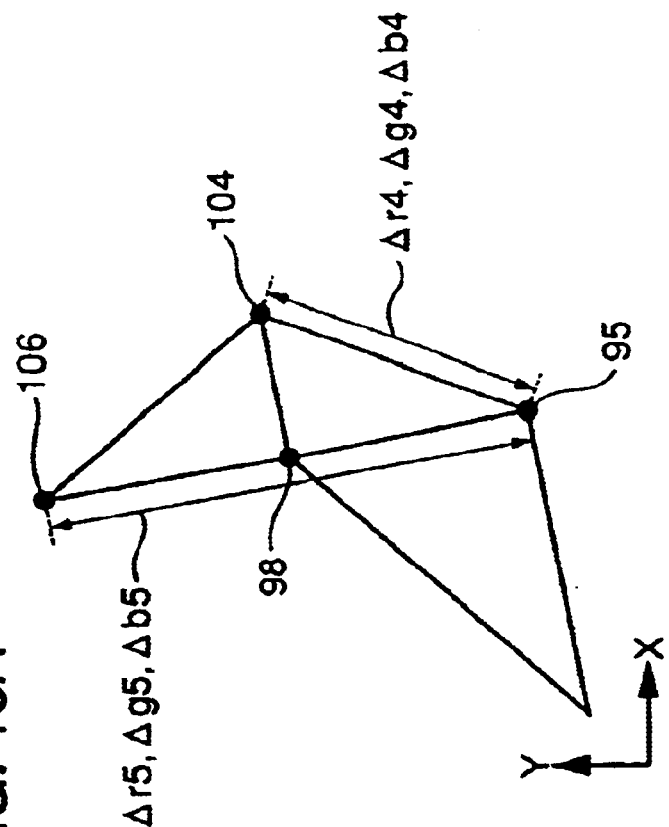

FIG. 18A shows the color definition data of the third polygon which is expressed by color data 98 at the third point, the same data from the basic polygon, and newly defined data 104 and 106 at the fourth and fifth points. FIG. 18B shows the identity bits and color data (r value, g value, b value) of the fifth, fourth and fifth points. Color data 106 at the fifth point of the third polygon is expressed by relative values from color data 95 at the first point of the basic polygon stored in starting coordinate register 52, "0" is set for the identity bit, and the difference from color data 95 at the first point of the basic polygon, relative values ($\Delta r5$, $\Delta g5$, $\Delta b5$) are set. Color data 104 at the fourth point of the third polygon is expressed by relative values from color data 95 at the first point of the basic polygon stored in staring point coordinate register 52, "0" is set for the identity bit, and the difference from color data 95 at the first point of the basic polygon, relative values ($\Delta r4$, $\Delta g4$, $\Delta b4$) are set. Color data 98 at the third polygon is expressed by relative values from color data 95 at the first point of the basic polygon stored in starting coordinate register 52, "0" is set for the identity bit, and the difference from color data 95 at the first point of the basic polygon, relative values ($\Delta r3$, $\Delta g3$, $\Delta b3$) are set.

The color data and identity bit of each vertex of the third polygon are set in vertex register 50 and identifying portion 51 shown in FIG. 12. The identity bit of the color data at the fifth point set in identifying portion 51 is "0", therefore color data 106 at the fifth point set in vertex register 1 and color data 95 at the first point of the basic polygon stored in starting point coordinate register 52 are added by operation unit 53 and output to set up circuit 54. The identity bit of the color data at the fourth point set in identifying portion 51 is "0", therefore color data 104 at the fourth point set in vertex register 2 and color data 95 at the first point of the basic polygon stored in starting point coordinate register 52 are added by operation unit 53 and output to set up circuit 54. The identity bit of color data at the third point set in identifying portion 51 is "0", and therefore color data 98 at the third point set in vertex register 3 and color data 95 at the first point of the basic polygon stored in starting point coordinate register 52 are added by operation unit 53 and output to set up circuit 54.

If, for example, the absolute value of the color data of a vertex is 32 bits, the relative value of the color data of the vertex is 16 bits, and 100 serial polygons are defined, ((32 bits×3)+(32 bits×99))=3264 bits will be necessary as data according to the conventional technique. Meanwhile, according to this embodiment, ((32 bits×1)+(16 bits×101))= 1648 bits will be necessary, and the same 100 polygons can be defined with 1648 bits. As a result, for the same memory access band width, the three-dimensional graphic processing device according to the embodiment can transfer 1.98 times as much polygon data as the conventional three-dimensional graphic processing device.

As described above, the three-dimensional graphic processing device according to this embodiment defines the color data of a vertex as the starting point of a basic polygon by an absolute value, while the color data of a series of polygons by relative values, so that the amount of data for the color data of the polygons may be reduced, which improves the drawing throughput. In addition, degradation in the performance of the three-dimensional graphic processing device as a whole caused by the restriction of the memory access band can be prevented.

Not that in application of the present invention to all the vertex data (polygon coordinate data, texture mapping coordinate data, color data) of vertex coordinates as described above, if the x-coordinate and y-coordinate of absolute coordinate values (the u-coordinate and v-coordinate of absolute values) are both 32 bits for one picture plane, the x-coordinate and y-coordinate (u-coordinate and v-coordinate of relative coordinate values) of relative coordinate values are 16 bits for ¼ a picture plane, the absolute value of color data is 32 bits, the relative value of the color data is 16 bits, and 100 serial polygons are defined, (((32+ 32+32+32+32) bits×3)+((32+32+32+32+32) bits×99))= 16320 bits will be necessary as data according to the conventional technique. Meanwhile, according to the present invention, (((32+32+32+32+32) bits×1)+((16+16+ 16+16+16) bits×101))=8240 bits will be necessary to define the vertex data of a polygon, and the same 100 polygons can be defined with 8240 bits. As a result, for the same memory access band width, the three-dimensional graphic processing device according to the embodiment can transfer 1.98 times as much polygon data as the conventional three-dimensional graphic processing device.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A three-dimensional graphic processing device, comprising:
   an identifying portion for identifying whether vertex data of a polygon to be drawn is an absolute value or a relative value;

an operation portion for operating to obtain an absolute value of vertex data identified as a relative value by said identifying portion; and a generation portion for generating data necessary for drawing based on the absolute value of the vertex data obtained by said operation portion, wherein said operation portion is configured to obtain the absolute value of vertex data expressed by a relative value in a polygon from vertex data expressed by an absolute value in another polygon.

2. The A three-dimensional graphic processing device, comprising:

an identifying portion for identifying whether vertex data of a polygon to be drawn is an absolute value or a relative value;

an operation portion for operating to obtain an absolute value of vertex data identified as a relative value by said identifying portion;

a generation portion for generating data necessary for drawing based on the absolute value of the vertex data obtained by said operation portion; and a storage portion for storing an absolute value of vertex data to be a starting point, wherein said operation portion is configured to obtain an absolute value of vertex data identified as a relative value by said identifying portion based on the absolute value of vertex data to be a starting point stored in said storage portion, said storage portion is configured to store vertex data expressed by an absolute value of a basic polygon, and said operation portion is configured to obtain an absolute value of vertex data in a polygon other than said basic polygon based on the vertex data expressed by the absolute value of the basic polygon stored in said storage portion.

3. The three-dimensional graphic processing device according to claim 1, wherein said vertex data is polygon coordinate data.

4. The three-dimensional graphic processing device according to claim 1, wherein said vertex data is texture mapping coordinate data.

5. The three-dimensional graphic processing device according to claim 1, wherein said vertex data is color data.

6. A three-dimensional graphic processing method, comprising the steps of:

identifying whether vertex data of a polygon to be drawn is an absolute value or a relative value;

operating to obtain an absolute value of vertex data identified as a relative value; and generating data necessary for drawing based on said obtained absolute value of vertex data, wherein said step of operating to obtain the absolute value of vertex data includes the step of operating to obtain an absolute value of vertex data expressed by a relative value in a polygon from vertex data expressed by an absolute value in another polygon.

7. A three-dimensional graphic processing method, comprising the steps of:

identifying whether vertex data of a polygon to be drawn is an absolute value or a relative value;

operating to obtain an absolute value of vertex data identified as a relative value; generating data necessary for drawing based on said obtained absolute value of vertex data; and storing an absolute value of vertex data to be a starting point, wherein said step of operating to obtain the absolute value of vertex data includes the step of operating to obtain an absolute value of vertex data expressed by a relative value based on the absolute value of said stored vertex data to be a starting point, said step of storing vertex data includes the step of storing vertex data expressed by an absolute value of a basic polygon, and said step of operating to obtain the absolute value of vertex data includes the step of operating to obtain an absolute value of vertex data in a polygon other than said basic polygon based on said stored vertex data expressed by the absolute value of the basic polygon.

8. The three-dimensional graphic processing method, according to claim 6, wherein said vertex data is polygon coordinate data.

9. The three-dimensional graphic processing method, according to claim 6, wherein said vertex data is texture mapping coordinate data.

10. The three-dimensional graphic processing method, according to claim 6, wherein said vertex data is color data.

* * * * *